United States Patent [19]
Noda et al.

[11] Patent Number: 4,710,608
[45] Date of Patent: Dec. 1, 1987

[54] FIXTURE FOR WELDING LONG WORKPIECES

[75] Inventors: Naoki Noda, Toyota; Iwao Nihashi, Okazaki; Kazuhiro Sato, Toyota, all of Japan

[73] Assignee: Toyota Jidosha Kabushiki Kaisha, Toyota, Japan

[21] Appl. No.: 36,569

[22] Filed: Apr. 9, 1987

[30] Foreign Application Priority Data

Apr. 9, 1986 [JP] Japan .................................. 61-81578

[51] Int. Cl.$^4$ ............................................... B23K 9/32
[52] U.S. Cl. ................................. 219/161; 219/125.1; 228/5.1; 228/15.1
[58] Field of Search ..................... 219/161, 125.1, 155, 219/136; 228/5.1, 15.1

[56] References Cited

U.S. PATENT DOCUMENTS 4,586,646   5/1986   Booher ................................. 228/5.1

FOREIGN PATENT DOCUMENTS

60-28994   2/1985   Japan .

Primary Examiner—Clifford C. Shaw
Attorney, Agent, or Firm—Oblon, Fisher, Spivak, McClelland, & Maier

[57] ABSTRACT

A welding fixture for holding a plurality of long component members that are welded along their lengths into an elongate product, having at least three stationary clamps disposed in spaced-apart relation with each other along the long component members, and at least three movable clamps disposed opposite to the stationary clamps, respectively, and cooperating the stationary clamps to clamp the component members in opposite clamping directions toward each other substantially perpendicular to the longitudinal direction of the component members. The fixture includes a pivot base disposed pivotally in a plane parallel to the clamping directions, and supporting at least one of the stationary clamps. The pivot base is supported by a supporting device pivotally about a pivot axis which is located on the component members clamped by the movable and stationary clamps. The base is pivoted by an actuator prior to welding of the component members along their lengths, in order to bend the component members so as to compensate for a warpage resulting from welding strains.

16 Claims, 13 Drawing Figures

FIXTURE FOR WELDING LONG WORKPIECES

BACKGROUND OF THE INVENTION

1. Field of the Invention

The present invention relates generally to a welding fixture for holding in place relatively long components members that are welded along their length into an elongate piece or product, and more particularly to such a welding fixture which is usable for both preliminary welding to prepare a pre-welded assembly of the component members, and main welding applied to the pre-welded assembly to produce the intended welded piece.

2. Discussion of the Prior Art

There are many varied elongate parts or products, each of which consists of a plurality of long component members which are welded together along their length. Generally, the component members of such products are first assembled in a given positional relation with each other, and the assembled members are subjected to a preliminary welding at a plurality of points that are spaced from each other in the longitudinal direction of the assembly. Then, a main welding is applied to the pre-welded assembly, to weld the component members continuously along their length. Thus, the desired welded product is obtained.

Figure 8:
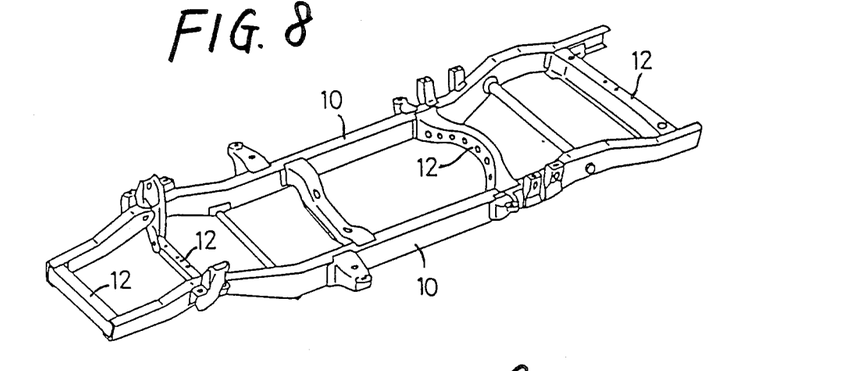
FIG. 8 is a perspective view of a frame of a truck, which includes two side rails to be prepared by welding using the instant fixture.
Figure 9:
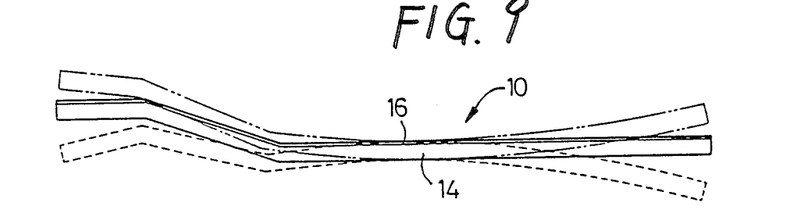
FIG. 9 is a view illustrating exaggeratedly a warpage of the side rail of FIG. 8 due to welding strains, and bends of the side rail given by the welding fixture to compensate for the warpage.
Figure 11:
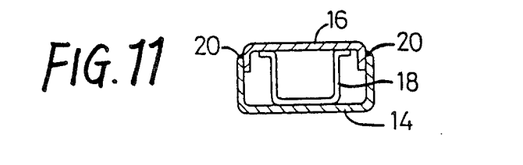
FIG. 11 is a view in transverse cross section of the side rail of FIG. 10.

For example, a frame of a truck or cargo vehicle includes a pair of elongate parts in the form of right and left side rails 10, and a plurality of cross members 12 which connect the two side rails 10, such that the side rails 10 and the cross members 12 form a ladder-like structure. Each of the side rails 10 consists of two relatively long component members, namely, an outer channel 14 and an inner channel 16, which have U-shaped transverse cross section, as shown in FIG. 11. The inner channel 16 is partially fitted in the opening of the outer channel 14, such that the two channels 14, 16 from an enclosed structure having a rectangular transverse cross section. A suitable spacer 18 is positioned within the enclosed structure to maintain a desired distance between the opposite long sides. In this condition, the overlapping longitudinal portions of the outer and inner channels 14, 16 are welded together by continuously applied welds indicated at 20 in FIG. 11. usually, this continuous welding will cause the welded side rail 10 to be warped, as illustrated in two-dot chain line in FIG. 9, due to welding strains. In the light of this undesirable phenomenon, it is a common practice to give the pre-welded assembly of the channels 14, 16 a suitable amount of bending in the direction opposite to the direction of the welding warpage, before the pre-welded assembly is subjected to the main welding process.

Laid-open Publication No. 60-28994 (published in 1985) of Japanese Patent Application discloses a welding fixture which is adapted to hold a pre-welded assembly in a slightly bent state for compensating for a subsequent welding warpage or deflection. The disclosed welding fixture uses at least three clamping units arranged in the longitudinal direction of the pre-welded assembly. Each clamping unit consists of a stationary clamp, and a movable clamp which is located opposite to the stationary clamp. The stationary and movable clamps cooperate to clamp the pre-welded assembly in opposite directions toward each other, at the corresponding longitudinal portion of the assembly. At least one of the stationary clamps used is supported on a pivot base which is pivotable in a plane parallel to the clamping direction. The pre-welded assembly is bent by a pivotal movement of the pivot base, due to a change in the position of the stationary clamp or clamps supported on the pivot base, relative the other stationary clamps.

In the welding fixture disclosed in the above-identified publication, the pivot axis about which the pivot base is pivoted is displaced a certain distance away from the pre-welded assembly, in the direction perpendicular to the length of the assembly. More specificaly, the pivot base is adapted to be pivoted about an axis which is located at substantially the same level as the base itself. Since the stationary clamps are supported on the pivot base via a considerably high support block, there is a considerably large distance between the long component members of the pre-welded assembly, and the pivot axis of the pivot base.

In the above arrangement, a pivotal motion of the pivot base will cause not only a change in the level of the stationary clamps on the pivot base, but also a change in the position of these stationary clamps in the longitudinal direction of the component members. For this reason, the welding fixture using this type of pivot base cannot be used for both preliminary and main welding processes, though the fixture can be used to compensate for a slight welding warpage. If the pivot base is pivoted by a suitable angle after the preliminary welding of the component members with the pivot base placed in a preliminary-welding position, the pre-welded assembly can be deflected or bent to compensate for the expected welding warpage due to strains which will occur in the subsequent main welding process. However, the pivotal movement of the pivot base while the pre-welded assembly is clamped by the stationary clamps on the pivot base, will cause a large amount of frictional slip of the stationary clamps relative to the clamped pre-welded assembly, since the position of the stationary clamps is shifted in the longitudinal direction. Accordingly, the clamping units tend to be damaged. Although the frictional slip may be avoided if the pre-welded assembly is unclamped prior to the pivotal movement of the pivot base, and reclamped after the pivotal movement, it is not desirable or permissible that the clamping positions are changed between the preliminary welding and the main welding, where the component members to be welded are not straight, or where the transverse cross sectional shape of the component members changes in the longitudinal direction. Hence, the welding fixture disclosed in the above-identified document cannot be used for both of the preliminary and main welding operations.

SUMMARY OF THE INVENTION

It is accordingly a first object of the present invention to provide a welding fixture having a pivot base whose pivotal movement will not cause a change in the position of stationary clamps supported on the pivot base, in the longitudinal direction of long component members that are welded along their length while being clamped by the fixture.

It is a second object of the invention to provide a welding fixture which is capable of handling different lengths of the component members.

It is a third object of the invention to provide a welding fixture which is capable of handling different configurations of the component members.

The first object of the invention is achieved according to the invention which provides a welding fixture for holding a plurality of long component members that are welded along their length into an elongate product, comprising: (a) at least three stationary clamps disposed in spaced-apart relation with each other in a longitudinal direction of the long component members; (b) at least three movable clamps disposed opposite to the at least three stationary clamps, respectively, and cooperating the at least three stationary clamps members to clamp the component members in opposite clamping directions toward each other substantially perpdndicular to the longitudinal direction of the component members; (c) a pivot base supporting at least one of the at least three stationary clamps; (d) a supporting device for supporting the pivot base pivotally in a plane parallel to the clamping directions, about a pivot axis which is located on the component members clamped by the movable and stationary clamps; and (e) a pivoting actuator operable for pivoting the pivot base prior to welding of the component members along the lengths thereof, and thereby bending the component members, so as to compensate for welding strains of the component members.

In the welding fixture of the present invention constructed as described above, a pivotal movement of the pivot base about the pivot axis on the component members will not cause a change in the position of the stationary clamp or clamps on the pivot base, in the longitudinal direction of the component members. Namely, the pivotal movement of the pivot base merely cause the stationary clamp or clamps to be shifted in the direction perpendicular to the longitudinal direction. Therefore, the clamping position of the component members before their bending remains unchanged even after completion of the bending, and consequently the instant welding fixture can be used for both the preliminary welding to tentatively fix the component members, and the main welding to finally weld the pre-welded assembly of the component members. If two separate welding fixtures are used, one for the preliminary welding, and the other for the main welding, the total equipment cost is increased and the installation space for the equipment is doubled. Moreover, it is necessary to remove the pre-welded assembly from the first fixture, and then set the removed re-welded assembly on the second fixture. These drawbacks are all overcome according to the present invention.

According to one feature of the invention, the pivot base is provided at two positions, in order to bend the opposite longitudinal end portions of the component members prior to the main welding operation.

According to another feature of the invention, the supporting device comprises a support member, a plurality of arcuate guides formed on one of the support member and the pivot base, along different circumferential portions of respective concentric circles which have different diameters and which have a center on the pivot axis, and a plurality of guided portions provided on the other of the support member and the pivot base, and guided by the plurality of arcuate guides, respectively. In this arrangement, each arcuate guide may serve its function even if its length is relatively small. Also, the support member or the pivot base which has the arcuate guides may have a comparatively small distance between the two guides as measured in the direction perpendicular to the pivot base.

In one form of the above feature of the invention, the arcuate guides consist of a plurality of arcuate grooves, and the guided portions consist of a plurality of rollers engaging the arcuate grooves, respectively.

According to a further feature of the invention, the supporting device comprises, a support member, a single arcuate guide formed on one of the support member and the pivot base, along an arc of a circle having a center on the pivot axis, and a plurality of guided portion which is provided on the other of the support member and the pivot base, and which is guided by arcuately spaced-apart portions of the arcuate guide, respectively.

In one form of the above feature of the invention, the arcuate guide consists of a partial gear consisting of a part of an externally toothed gear, and the guided portions consist of a plurality of small gears engaging the partial gear.

According to a still further feature of the invention, the supporting device consists of a link mechanism including a plurality of link bars, and a plurality of pins which pivotally connect the link bars with each other.

According to a yet further feature of the invention, the pivot base supports at least three stationary clamps whose clamping surfaces generally define a curvature following a curvature of the component members after the component members are bent by a pivotal movement of the pivot base. In this arrangement, the component members can be bent to an ideal shape in the direction opposite to the direction of the subsequent welding warpage. It is noted that the stationary clamps formed as described above will cause the component members to be curved following the curvature of the clamping surfaces of the stationary clamps, even when the component members are clamped with the pivot base placed in its non-pivoted position for the preliminary welding. However, this does not create a problem, as long as the amount of the curvature of the clamping surfaces of the clamps is not considerably large.

The second object of the present invention is achieved according to yet another feature of the invention, which consists in the use of a longitudinally movable support which is movable in the longitudinally direction of the component members The pivot base is supported on the longitudinally movable support, so that the at least one stationary clamp supported on the pivot base functions as at least one longitudinally movable clamps. In this case, the position of the stationary clamp or clamps provided on the pivot base can be changed as needed depending upon the length of the component members, by moving the longitudinally movable support in the longitudinal direction of the component members. Accordingly, the instant arrangement is capable of handling two or more different configurations of the end portions of the component members.

In one preferred form of the above feature of the invention, the welding fixture further comprises a transversely movable support which is movable in a transverse direction of the component members, so as to be located at a position occupied by the longitudinally movable support before the longitudinally movable support is moved away from the position. In this instance, at least one additional stationary clamp is supported on the transversely movable support. The additional stationary clamp or clamps cooperate with the above-indicated longitudinally movable clamp or clamps and the other stationary clamps to hold the component members, when the additional stationary clamp or clamps are positioned between the longitudinally movable clamp or clamps and the other stationary clamps. According to this arrangement, the portion of the component members which are not clamped by the longitudinally movable clamp or clamps on the longitudinally movable support, or by the other stationary clamps, are clamped by the additional stationary clamp or clamps supported on the transversely movable support placed in its operative position.

In another preferred form of the above feature of the invention, the longitudinally movable is positioned so that the at least one longitudinally movable clamp holds one of the opposite end portions of the component members, and the pivot axis of the pivot base is located at one end of the one end portion of the component members which is nearer to the other end portion. In this case, the welding fixture further comprises a first stop provided on the pivot base, and a plurality of second stops fixedly disposed in spaced-apart relation which each other in the longitudinal direction. The second stops have abutment surfaces which are selectively abutable on the first stop, depending upon a longitudinal position of the longitudinally movable support. The second stops are adapted such that a distance of the abutment surfaces to the pivot axis in a direction perpendicular to the longitudinal direciton and the pivot axis, decreases as the corresponding second stops are located nearer to the pivot axis in the longitudinal direction. According to this arrangement, a pivoting angle of the pivot base determined by the abutment of the first stop on the abutment surfaces increases as the lengths of the component members increase.

The third object of the present invention is attained according to still another feature of the invention, which consists in the use of a transversely movable support which is movable in a transverse direction of the component members. In this instance, a plurality of groups or arrays of stationary clamps are supported on the transversely movable support, such that the stationary clamps of each group are arranged in the longitudinal direction, so as to follow a configuration of corresponding one of a plurality of different products to be obtained by welding, as viewed in the clamping directions. The transversely movable support has a plurality of operating positions corresponding to the plurality of groups of stationary clamps, and is moved selected one of the operating positions to bring one of the groups of stationary clamps into an operative position, according to the desired one of the different products. The present arrangement can handle two or more different configurations of the products (assembled component members), by selecting the corresponding group or array of stationary clamps on the transversely movable support.

In one form of the above feature of the invention, the welding clamp further comprises a longitudinally movable support which is movable in the longitudinal direction and which supports at least one movable clamp used in the fixture. The longitudinally movable support has a plurality of operating positions, and is moved to one of the operating positions thereof according to the selected operating position of the transversely movable support. The movable p or clamps on the longitudinally movable support cooperate with the plurality of groups of stationary clamps on the transversely movable support, to clamp the component members of desired one of the different products.

In accordance with a further feature of the invention, the at least three movable clamps used in the welding fixture are disposed above the at least three stationary clamps, and are lowered and elevated relative to the stationary clamps.

The welding fixture of the invention may further comprise at least one pair of auxiliary clamps, each pair corresponding to a pair of main clamps. The pair of main clamps consists of one of the stationary clamps used in the fixture, and the corresponding one of the movable clamps. The auxiliary clamps are adapted to clamp the component members in opposite directions substantially perpendicular to the clamping directions of the main clamps.

BRIEF DESCRIPTION OF THE DRAWINGS

The above and other objects, features and advantages of the present invention will be better understood by reading the following detailed description of preferred embodiments of the invention, when considered in connection with the accompanying drawings, in which:

FIG. 1 is a front elevational view of one embodiment of a welding fixture of the present invention for holding long members to be welded into an elongate piece;

DETAILED DESCRIPTION OF THE PREFERRED EMBODIMENTS

Figure 2:
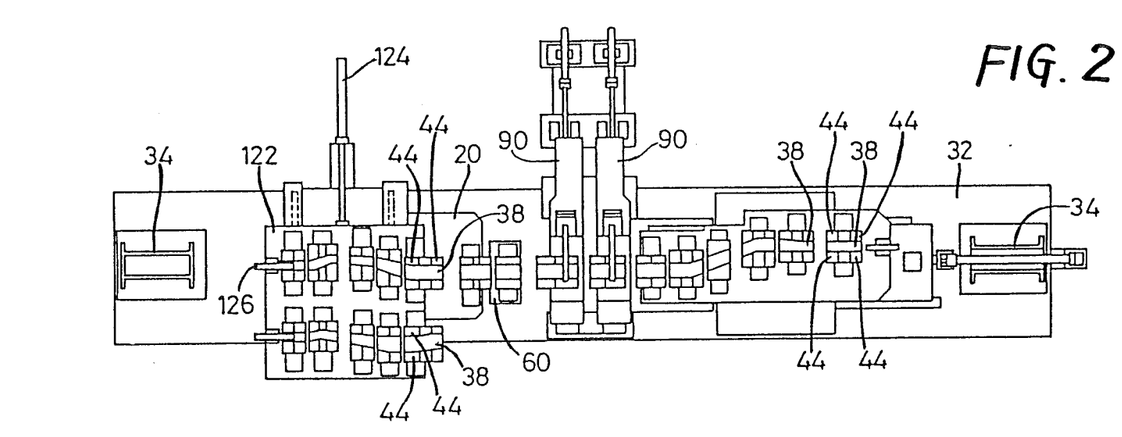
FIG. 2 is a cross sectional view taken along line II—II of FIG. 1.

Referring first to FIGS. 1 and 2, there is shown a welding fixture for holding relatively long component members that are to be welded along their lengths into a side rail for a frame of a truck. The welding fixture has a portal main frame generally indicated at 30. The main frame 30 consists of a bed 32, a pair of columns 34 extending upright from the bed 32, and an upper beam 36 supported by the columns 34 such that the upper beam 36 extends parallel to the bed 32 between the two columns 34.

Figure 3:
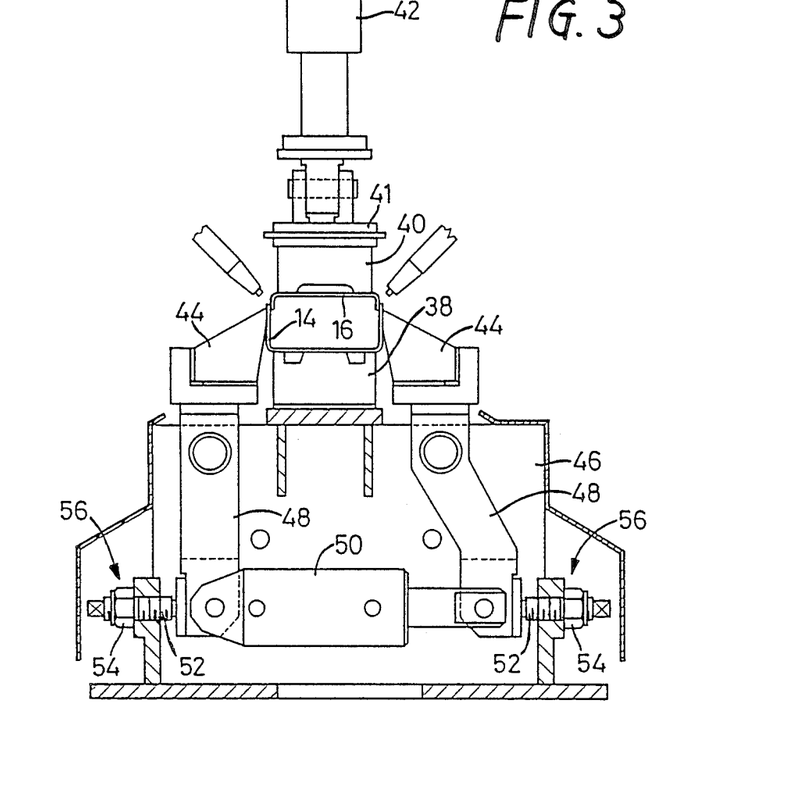
FIG. 3 is a side elevational view in cross section, showing a typical example of a clamping unit used in the welding fixture.

The bed 32 supports a multiplicity of lower stationary clamps 38 as shown in enlargement in FIG. 3, while the upper beam 36 supports a multiplicity of upper movable clamps 40. Each of the upper movable clamps 40 is fixed to a holder plate 41 which is supported pivotally. The holder plates 41 are lowered and elevated by respective hydraulic cylinders 42, to move the upper movable clamps 40 toward and away from the lower stationary clamps 38, whereby the long component members of the side rail, i.e., an outer channel 14 and an inner channel 16, are clamped together in opposite vertical directions, by the lower and upper clamps 38, 40. In the present embodiment, the lower stationary clamps 38 and the upper movable clamps constitute main clamping units for vertical clamping of the workpieces in the form of the outer and inner channels 14, 16.

In addition to the main or vertical clamping units 38, 40, a multiplicity of auxiliary clamping units in the form of side clamps 44 are provided as indicated in FIG. 3, for clamping the channels 14, 16 in the lateral or horizontal direction. These side clamps 44 are attached to pivot arms 48 that are pivotally supported by a bracket 46 mounted on the bed 32. The pivot arms 48 are operated by a hydraulic cylinder 50, so that the pair of side clamps 44 are moved toward and away from each other. A minimum distance between the two mating side clamps 44 is determined by two stoppers 56 each of which includes an adjusting screw 52 and a lock nut 54. The number of the main or vertical clamping units (38, 40) is almost equal to that of the auxiliary or side clamping units (44). The corresponding vertical and side clamping units are adapted to act on neighboring longitudinal portions of the channels 14, 16. However, at some longitudinal portions of the channels, only the side clamping units are provided.

Referring back to FIG. 1, the lower and side clamps 38, 44 of the clamping unit located almost in the middle of the length of the fixture are supported on a lower stationary support 60 fixedly mounted on the bed 32. The upper movable clamp 40 corresponding to the lower clamp 38 on this support 60 is supported on a first upper stationary support 62 secured to the upper beam 36. The upper movable clamp 40 provided to the left of the upper clamp 40 on the first upper stationary support 62 is supported on a second upper stationary support 64. The upper movable clamps 40 provided furthe to the left ofthe clamps 40 on the upper stationary supports 62, 64 are supported on a first upper longitudinally movable support 66, which is supported by the upper beam 36, movably in the longitudinal direction of the beam, that is, in the longitudinal directoin of the channels 14, 16. The movable support 66 is moved by a hydraulic cylinder 68 fixed to the upper beam 36. The other upper movable clamps 40 provided on the right-hand side of FIG. 1 are supported on a second longitudinally movable support 70, which is moved by a hydraulic cylinder 72 in the longitudinal direction of the channels 14, 16. The second upper longitudinally movable support 70 is locked in place by a positioning pin (not shown) which is actuated by a hydraulic cylinder 74.

On the opposite side surfaces of the upper beam 36, guide rails 76 are fixed so as to extend in the longitudinal direction of the beam 36. Each of the guide rails 76 slidably supports three slides 78 (only one slide shown in FIG. 1). Each slide 78 carries a welding robot fixed thereto, and is moved by rotation of a feedscrew 80 so that the channels 14, 16 are welded along their lengths by the welding robot.

Figure 4:
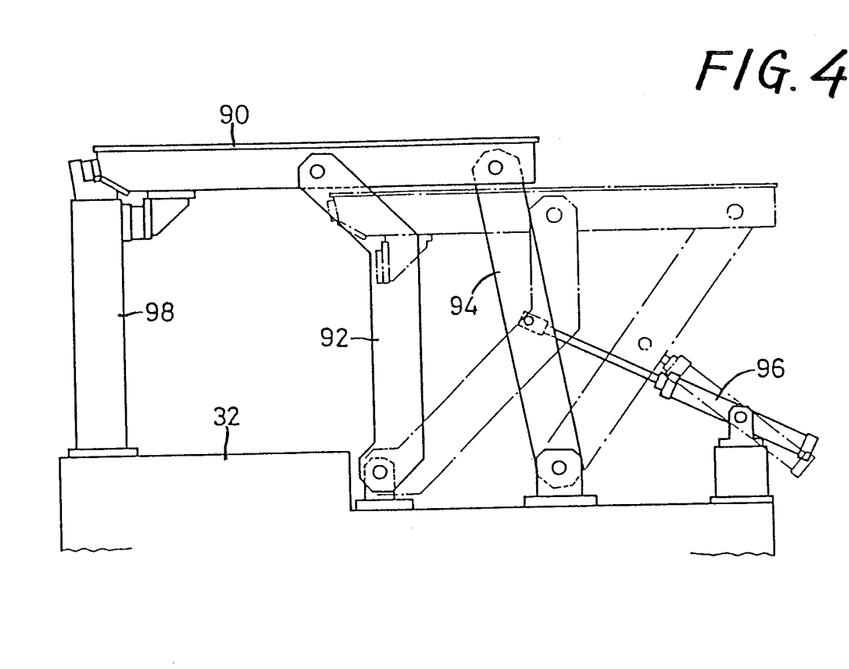
FIG. 4 is a side elevational view of a transversely movable support used in the welding fixture.

Two first transversely movable supports 90 are provided on the bed 32, to the right of the lower stationary support 60. These first transversely movable supports 90 are movable in the transverse direction of the channels 14, 16, namely, in the direction perpendicular to the lengths of the channels 14, 16. Each of the movable supports 90 carries the respective lower stationary clamp 38 fixed thereto, and is movably attached to the bed 32 through a first and a second pivotally supported link bar 92, 94, as illustrated in FIG. 4. The bed 32, movable support 90, and first and second link bars 92, 94 cooperate to form a parallel motion mechanism. This mechanism is actuated by a hydraulic cylinder 96 connected to the link bar 94, so that the transversely movable support 90 is moved between its operative or advanced position indicated in solid line in FIG. 4, and its inoperative or retracted position indicated in one-dot chain line in the figure. The operative position of each transversely movable support 90 is determined by a stop block 98 secured to the bed 32.

Figure 5:
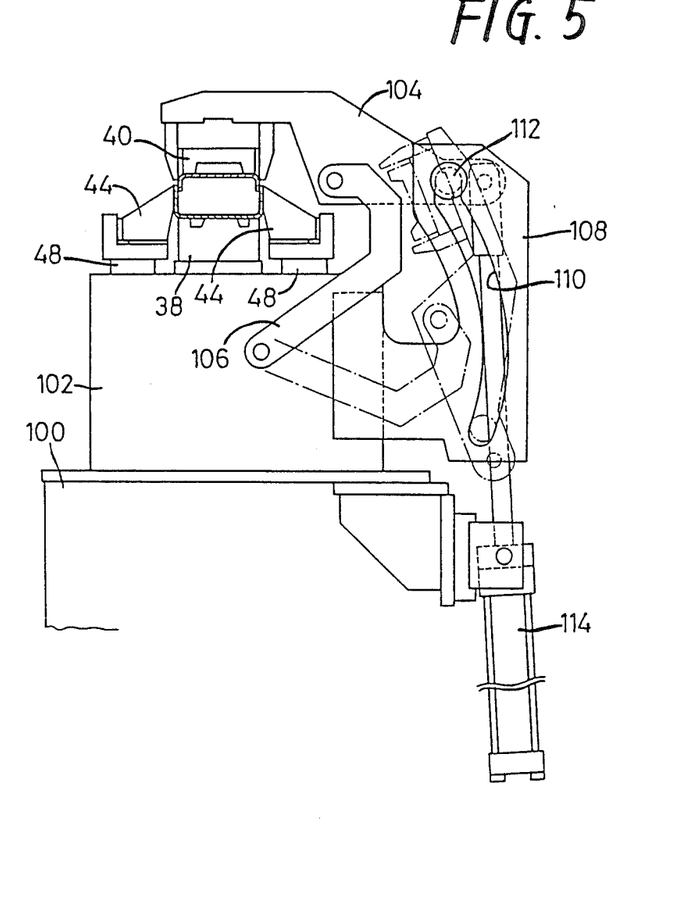
FIG. 5 is a side elevational view of a clamping unit supported on the transversely movable support of FIG. 4.

The lower stationary clamp 40 on each first transversely movable support 90 is fixed thereto via two brackets 100, 102, as shown in FIG. 5. Further, a pair of side clamps 44, 44 are mounted on the bracket 102, via the pivot arms 48 similar to those shown in FIG. 3. The bracket 102 also supports one of the upper movable clamps 40, via a pivot arm 104 and a link bar 106. A groove cam 108 having a cam groove 110 is attached to the bracket 102, such that a cam follower roller 112 rotatably fixed to the pivot arm 104 is held in rolling engagement with the cam groove 110. The pivot arm 104 is connected to a piston rod of a hydraulic cylinder 114, which piston rod is supported pivotally by the bracket 100. With the hydraulic cylinder 114 activated in the opposite directions, the pivot arm 104 is moved between its operative position indicated in solid line in FIG. 5, and its inoperative or retracted position indicated in one-dot chain line in the figure.

Figure 10:
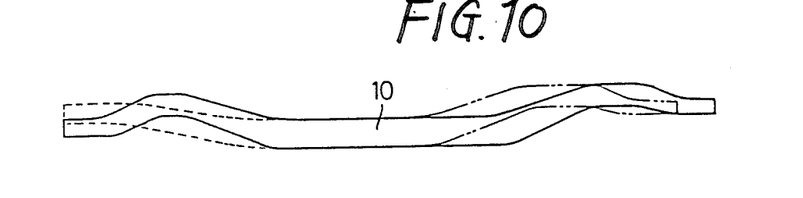
FIG. 10 is an illustration showing different types of a side rail to be prepared by welding using the instant welding fixture.

The lower stationary clamps 38 and the side clamps 44 which are located to the left of the lower stationary support 60 fixed in the middle of the bed 32 (as seen in FIG. 1), are supported on a first pivot base 120. Most of the clamps 38, 44 supported on this first pivot base 120 are mounted on a second transversely movable support 122 which is movable in the transverse direction of the channel 14, 16. As indicated in FIG. 2, the second transversely movable support 122 carries two groups or arrays of clamps fixed thereto such that the two arrays are spaced apart from each other in the transverse direction of the channels 14, 16, i.e., in the direction of movement of the support 122. Described more specifically, each array consists of the two or more lower stationary clamps 38 and the two or more pairs of side clamps 44. The clamps 38, 44 of the first array are arranged in the longitudinal direction of the channels 14, 16, so as to follow the configuration of the front portion of one side rail 10 (welded piece), indicated in broken line in FIG. 10. The clamps 38, 44 of the second array are arranged, so as to follow the configuration of the corresponding front portion of another side rail 10, indicated in solid line in the same figure. The second transversely movable support 122 is moved by a hydraulic cylinder 124 to one of two operating positions, to bring one of the two arrays of the clamps into its operative position, depending upon the desired one of the two side rails 10 to be prepared by welding the channels 14, 16 using the instant welding fixture. The front end of the assembled channels 14, 16 is the upper movable clamp 40 which is moved between its lower operative and upper inoperative positions, by a pivot arm 126 activated by a hydraulic cylinder 128.

The lower stationary clamps 38 and side clamps 44 located to the right of the first transversely movable supports 90 (as seen in FIG. 1) are supported on a second pivot base 130 which is mounted on a lower longitudinally movable support 132. This support 132 is moved by a hydraulic cylinder 134 in the longitudinal direction of the channels 14, 16, to one of four operating positions corresponding to different lengths of the side rails 10. For example, two different lengths of the side rails 10 are indicated in solid and one-dot chain lines in FIG. 10. Namely, the rear end portions of the two side rails 10 have the same configuration, but the middle portions have different lengths. When one of the two operating positions of the second lower transversely movable support 122 is selected, the corresponding one of the four operating positions of the longitudinally movable support 132 is selected. With the movable support 132 moved in the longitudinal direction, the clamps 38, 44 on the second pivot base 130 are accordingly moved to the positions that meet the length of the desired rail 10 to be prepared.

Figure 6:
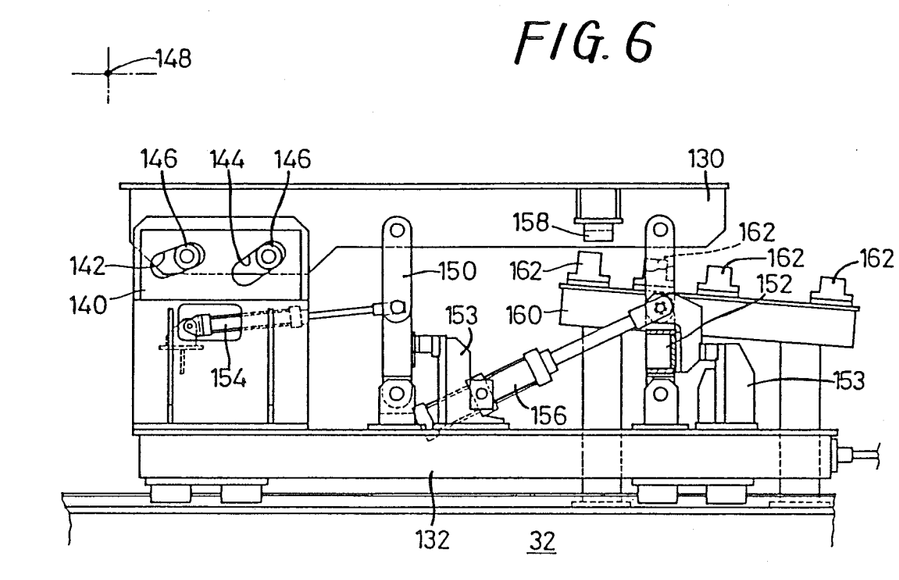
FIG. 6 is a front elevational view of a mechanism for pivoting a pivot base used in the welding fixture.

The first and second pivot bases 120 and 130 are pivoted by respective pivoting mechanisms or actuators which are identically constructed. The construction of these mechanisms will be described referring to FIG. 6, in connection with the second pivot base 130. The following description and the illustration in FIG. 6 also apply to the first pivot base 120. On the longitudinally movable support 132, there is fixed a support member 140 which has two arcuate guides in the form of two arcuate grooves 142, 144. The second pivot base 130 has two guided portions rotatably fixed thereto in the form of two cam follower rollers 146, 146 which engage the respective arcuate grooves 142, 144. The arcuate grooves are formed along different circumferential portions of respective concentric circles which have different diameters and which have a common center on a pivot axis 148 about which the second pivot base 130 is pivoted. The pivot axis 148 is located on the channels 14, 16, more precisely, at the neutral axis of the semiwelded channels 14, 16, which axis is stationary even when the are warped due to strains arising during a subsequent primary welding process, as described later. Further, the pivot axis 148 is located at the end of the lower stationary clamp 38 located at the end of the second pivot base 130 on the side of the transversely movable supports 90. The second pivot base 130 is connected to the longitudinally movable support 132 by means of a first and a second two-bar link 150, 152, so that the base 130 takes it horizontal position when the two-bar links 150, 152 are stopped by a stop 153, as indicated in FIG. 6. With the links 150, 152 operated by respective hydraulic cylinders 154, 156, the pivot base 130 is pivoted clocksise (in FIG. 6) about the pivot axis 148, while the cam follower rollers 146 are moved in the arcuate grooves 146, 146. The pivoting angle of the pivot base 130 is determined by means of abutment of a first stop 158 fixed to the pivot base 130, on one of four second stops 162 fixed to a support 160 secured to the bed 32. More particularly, the first stop 158 is moved relative to the four stationary second stop 162 as the longitudinally movable support 132 is moved to one of the four operating positions. Thus, the first stop 158 is selectively abutable on one of the four second stops 162, depending upon the selected operating position of the longitudinally movable support 132 or the second pivot base 130. As indicated in FIG. 6, the support 160 is inclined so that the distance between the abutting surfaces of the first and second stops 158, 162 decreases as the position of the second stops 162 becomes nearer to the pivot axis 148 in the longitudinal direction of the welding fixture. In other words, the height of the second stops 162 decreases with an increase in the distance between the pivot axis 148 and the second stops 162 in the longitudinal direction of the channels 14, 16. In this arrangement, the angle of pivoting of the second pivot base 130 increases as the longitudinally movable support 132 is moved an increasing distance in the right direction (in FIG. 6), to meet an increasing length of the channels 14, 16.

The operation of the instant welding fixture will next be described.

The instant fixture is adapted to handle four different lengths of the channels 14, 16, and two different configurations of their front portions, in order to produce a total of eight different types of side rails. FIGS. 1 and 2 show the welding fixture when placed in its position for the longest channels 14, 16 (side rail), wherein the second upper longitudinally movable support 70 and the lower longitudinally movable support 132 are located at their most retracted or outermost operating positions. In this position, the lower stationary and side clamps 38, 44 on the second pivot base 130 are located the maximum distance away from the clamps 38, 44 on the stationary support 60. Between the stationary support 60 and the longitudinally movable support 132, the two first transversely movable supports 90 are located, so that the clamps 38, 44 on these supports 90 cooperate with the clamps 38, 44 on the supports 60, 120 and 132, and the movable clamps 40, to clamp the channels 14, 16 at their substantially equally spaced-apart portions over their entire lengths. During a preliminary welding or pre-welding process, the first and second pivot bases 120, 130 are held in their horizontal position, to clamp the channels 14, 16 according to their original posture.

Figure 7:
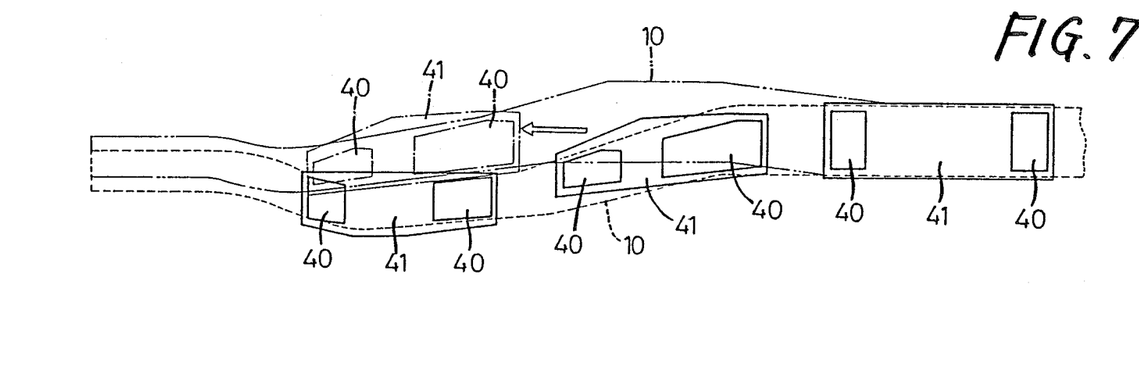
FIG. 7 is an explanatory view, illustrating two different configurations of a front portion of a side rail to be prepared by welding, in relation to the position of upper movable clamps.

Depending upon the configuration of the front portion of the channels 14, 16, the second lower transversely movable support 120 is located at the appropriate one of the two operating positions, i.e., either the position shown in FIG. 2 in which the upper array of the clamps 38, 44 (as seen in the figure) is in the clamping position, or the position at which the lower clamp array is in the clamping position. The upper movable clamps 40 supported on the first upper longitudinally movable support 66 are moved to the position indicated in solid line in FIG. 7, or the position indicated in one-dot chain line in the same figure, so that the channels 14, 16 for the side rail 10 indicated in two-dot chain line, or the channels 14, 16 for the side rail 10 indicated in dashed line, are clamped in the vertical direction. In the position indicated in solid line in FIG. 7, the right one of two clamping portions of the longitudinally movable upper clamp 40 supported on the same holder plate 41 is held in abutting contact with an inclined portion of the channels 14, 16, while the left clamp 40 is spaced away from a straight portion of the channels. In the position indicated in one-dot chain line, both of the right and left clamps 40, 40 on the same holder plate 41 are held in abutment on the straight portion of the channels 14, 16. The leftmost upper clamp 40 (as seen in FIG. 7) is not used for the side rail 10 indicated in two-dot chain line, that is, kept positioned above the channels 14, 16.

After the channels 14, 16 have been clamped with the pivot bases 120, 130 placed in their horizontal position, the channels 14, 16 are subjected to a preliminary welding by the three welding robots slidably mounted on each side of the upper beam 36. The preliminary welding is effected at a large number of spots along the lengths of the channels 14, 16, at which they are clamped by the side clamps 44. Then, the first and second pivot bases 120, 130 are pivoted to the positions determined by the appropriate stops 162. As a result, the front and rear end portions of the pre-welded channels 14, 16 are bent by suitable angles, in order to compensate for a warpage of the channels 14, 16 due to strains which will occur during a subsequent primary welding process. As previously indicated, each pivot base 120, 130 is pivoted about their pivot axis 148 which is located at the inner end of the innermost lower stationary clamp 38 provided at the inner end of the pivot base 120, 130 on the side of the stationary support 60 or transversely movable supports 90. Therefore, the pivotal movements of the pivot bases 120, 130 will not cause a change in the level of the upper surface of the innermost lower clamp 38 on each pivot base 120, 130, relative to the lower clamps 38 on the stationary support 60 and the movable supports 90. Accordingly, the front and rear portions of the pre-welded channels 14, 16 can be smoothly bent or warped.

Further, the pivotal movements of the first and second pviot bases 120, 130 will not cause a substantial change in the position of the lower and side clamps 38, 44 supported on the bases 120, 130 in the longitudinal direction of the pre-welded channels 14, 16. This means almost no frictional slip between these clamps 38, 44 and the channels 14, 16. Thus, the instant arrangement is effective to prevent damage or wear of the channels 14, 16 due to the pivoting movements of the pivot bases 120, 130.

The lower stationary clamps 38 on the first and second pivot bases 120, 130 are adapted such that the upper surfaces on the clamps 38 on each base 120, 130 are arranged along a slight upwardly convex curvature, so that the bent portions of the channels 14, 16 are slightly upwardly curved. In this arrangement, the front and rear portions of the channels 14, 16 are slightly curved or deflected even when they are clamped before the preliminary welding, with the pivot bases 120, 130 held in their horizontal position. However, the positioning of the channels 14, 16 will not be significantly deteriorated, since the above curvature is very small.

After the front and rear portions of the pre-welded channels 14, 16 have been bent by the pivotal movements of the first and second pivot bases 120, 130, the channels 14, 16 are then subjected to the main welding process by the three welding robots on each side of the upper beam 36. This main welding is effected continuously along the entire length of the channels 14, 16. Then, the first and second pivot bases 120, 130 are restored to their horizontal position, and the side clamps 40 and movable clamps 44 are moved away from the welded piece or side rail 10, whereby the side rail 10 is freed from the clamping pressures by the instant welding fixture. The side rail 10 is then removed from the welding fixture by an unloading device (not shown) provided on the rear side of the fixture (upper part of FIG. 2), and new workpieces or channels 14, 16 are loaded by a loading device (not shown) provided on the front side of the fixture.

Where the workpieces 14, 16 have the second largest length, one of the two transversely movable supports 90 on the side of the longitudinally movable support 132 is located at its retracted inoperative position. Further, the longitudinally movable supports 70, 132 are advanced toward the central part of the fixture, and located at the operating position for the second largest length. In this position, the pivoting angle of the second pivot base 130, for example, is determined by the second stop 162 as counted from the rightmost stop 162 as seen in FIGS. 1 and 6. In this case, therefore, the pivoting angle of the pivot base 130, or the corresponding amount of bending given to the channels 14, 16 is reduced, as compared with that for the side rail 10 having the largest length.

In the case where the workpieces 14, 16 have the third largest length, both of the transversely movable supports 90 are located at their inoperative position, and the longitudinally movable supports 70, 132 are further advanced to the operating position corresponding to the third largest length. Consequently, the pivoting angle of the pivot base 130 is further reduced.

The longitudinally movable supports 70, 132 are moved to the fully advanced operating position, where the channels 14, 16 have the shortest length. In this case, the pivoting angle of the pivot base 130 is the smallest.

Figure 12:
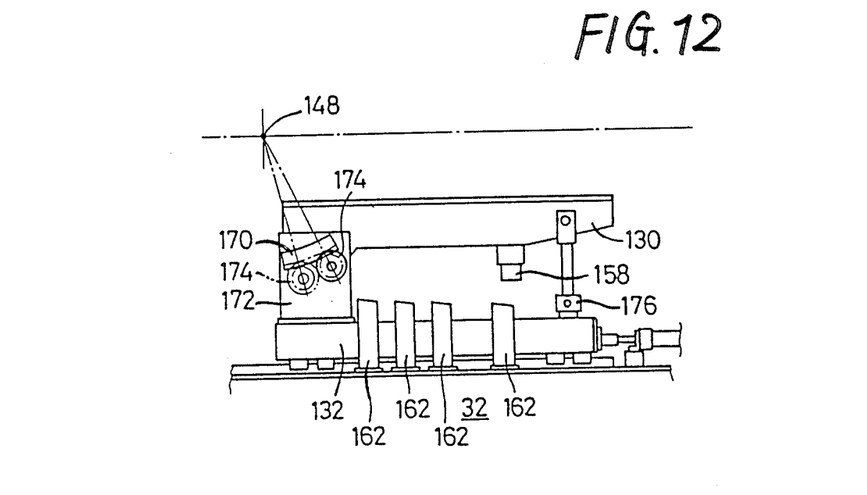
FIGS. 12 and 13 are schematic front elevational views of different mechanisms for pivoting the pivot base used in other embodiments of the invention.

While the present invention has been described in detail in its preferred embodiment, referring to FIGS. 1–11, various changes and modifications may be made in the invention. For example, the mechanism for piviting the second pivot base 130 may be modified as illustrated in FIGS. 12 and 13. In the arrangement of FIG. 12, The pivot base 130 has fixed thereto a partial gear 170 which consists of a part of an externally toothed gear having a center at the pivot axis 148 on the channels 14, 16. A support member 172 is secured to the longitudinally movable support 132. Two gears 174 having a smaller diameter than the partial gear 170 are attached to the support member 172, such that the two small gears 174 mesh with the partial gear 170. Biasing means (not shown) is provided for biasing the partial gear 170 toward the small gears 174, to maintain the meshing engagement between the partial gear 170 and the small gears 174. The pivot base 130 is connected to the piston rod of a hydraulic cylinder 176 which is pivotally connected to the longitudinally movable support 132. A retracting movement of the piston rod of the cylinder 176 will cause the pivot base 130 to be pivoted about the pivot axis 148. The pivoting angle is determined by means of abuting contact of the first stop 158 on the pivot base, with one of the second stops 162 secured to the bed 132.

Figure 13:
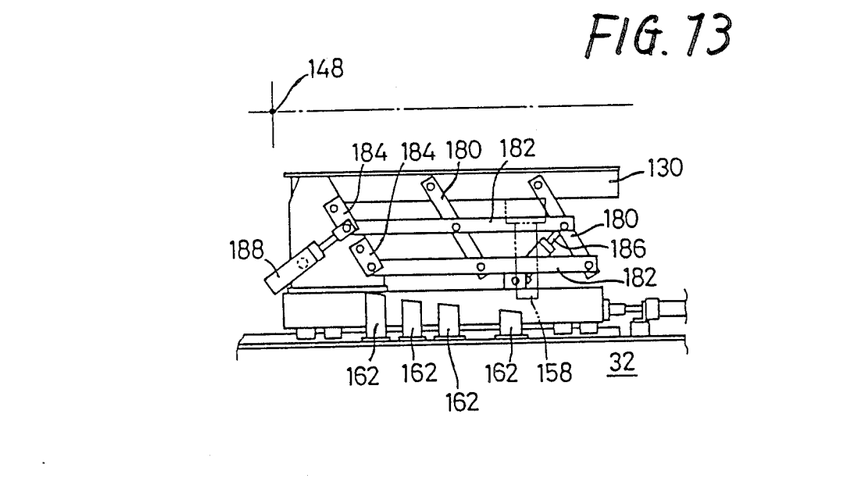

Another modified arrangement shown in FIG. 13 uses a parallel motion mechanism which includes link bars 180, 182, 184 pivotally connected to each other and to the pivot base 130 as shown in the figure. The parallel motion mechanism is connected to two hydraulic cylinders 186, 188 so that the the pivot base 130 is pivoable about the pivot axis 148 located on the channels 14, 16. As in the preceding embodiments, the pivoting angle of the pivot base 130 is determined by the first stop 158 (indicated in two-dot chain line) fixed to the base 130, and the appropriate one of the four second stops 162 secured to the bed 32.

It will be obvious to those skilled in the art that various other changes, modifications and improvements may be made in the individual components or assemblies of the welding fixture according to the invention, in the light of the foregoing teachings. For instance, the welding fixture may be modified to handle welding of relatively long pieces or products other than the side rails for a vehicle frame.

What is claimed is:

1. A welding fixture for holding a plurality of long component members that are welded along their length into an elongate product, comprising:
   at least three stationary clamps disposed in spaced-apart relation with each other in a longitudinal direction of said long component members;
   at least three movable clamps disposed opposite to said at least three stationary clamps, respectively, and cooperating with said at least three stationary clamps members to clamp said component members in opposite clamping directions toward each other substantially perpendicular to said longitudinal direction of the component members;
   a pivot base supporting at least one of said at least three stationary clamps;
   a supporting device for supporting said pivot base pivotally in a plane parallel to said clamping directions, about a pivot axis which is located on said component members clamped by said movable and stationary clamps; and
   a pivoting actuator operable for pivoting said pivot base prior to welding of said component members along the lengths thereof, and thereby bending said component members, so as to compensate for welding strains of the component members.

2. A welding fixture according to claim 1, wherein said pivot base is provided at two positions corresponding to opposite longitudinal end portions of said component members.

3. A welding fixture according to claim 1, wherein said supporting device comprises:
   a support member;
   a plurality of arcuate guides formed on one of said support member and said pivot base, along different circumferential portions of respective concentric circles which have different diameters and which have a center on said pivot axis; and
   a plurality of guided portions provided on the other of said support member and said pivot base, and guided by said plurality of arcuate guides, respectively.

4. A welding fixture according to claim 3, wherein said arcuate guides consist of a plurality of arcuate grooves, and said guided portions consist of a plurality of rollers engaging said arcuate grooves, respectively.

5. A welding fixture according to claim 1, wherein said supporting device comprises:
   a support member;
   a single arcuate guide formed on one of said support member and said pivot base, along an arc of a circle having a center on said pivot axis; and
   a plurality of guided portion provided on the other of said support member and said pivot base, and guided by arcuately spaced-apart portions of said arcuate guide, respectively.

6. A welding fixture according to claim 5, wherein said arcuate guide consists of a partial gear consisting of a part of an externally toothed gear, and said guided portions consist of a plurality of small gears engaging said partial gear.

7. A welding fixture according to claim 1, wherein said supporting device consists of a link mechanism including a plurality of link bars, and a plurality of pins which pivotally connect said link bars with each other.

8. A welding fixture according to claim 1, wherein said pivot base supports at least three clamps of said at least three stationary clamps, said at least three clamps supported on said pivot base having clamping surfaces which generally define a curvature following a curvature of said component members after the component members are bent by a pivotal movement of said pivot base.

9. A welding fixture according to claim 1, further comprising a longitudinally movable support which is movable in the longitudinal direction of said component members, said pivot base being supported on said longitudinally movable support, whereby said at least one stationary clamp supported on said pivot base functions as at least one longitudinally movable clamps.

10. A welding fixture according to claim 9, further comprising:
    a transversely movable support which is movable in a transverse direction of said component members, so as to be located at a position occupied by said longitudinally movable support before the longitudinally movable support is moved away from said position; and
    at least one additional stationary clamp supported on said transversely movable support, and cooperating with said at least one longitudinally movable clamp and said other stationary clamps to hold said component members, when said at least one additional stationary clamp is positioned between said at least one longitudinally movable clamp and said other stationary clamps.

11. A welding fixture according to claim 9, wherein said longitudinally movable is positioned so that said at least one longitudinally movable clamp holds one of opposite end portions of said component members, and said pivot axis of said pivot base is located at one end of said one end portion of the component members which is nearer to the other end portion, said welding fixture further comprising:
    a first stop provided on said pivot base; and
    a plurality of second stops fixedly disposed in spaced-apart relation with each other in said longitudinal direction, said plurality of second stops having abutment surfaces which are selectively abutable on said first stop, depending upon a longitudinal position of said longitudinally movable support, a distance of said abutment surfaces to said pivot axis in a direction perpendicular to said longitudinal direction and said pivot axis, decreasing as the corresponding second stops are located nearer to said pivot axis in said longitudinal direction, whereby a pivoting angle of said pivot base determined by the abutment of said first stop on said abutment surfaces increases as the lengths of said component members increase.

12. A welding fixture according to claim 10, wherein at least one of said at least three movable clamps is supported on said transversely movable support, movably toward and away from said at least on additinal stationary clamp supported on said transversely movable support, and thereby cooperates with said at least one additional stationary clamp to clamp said component members.

13. A welding fixture according to claim 1, further comprising a transversely movable support which is movable in a transverse direction of said component members, said at least three stationary clamps including a plurality of groups of stationary clamps which are supported on said transversely movable support, such that the stationary clamps of each group are arranged in said longitudinal direction, so as to follow a configuration of corresponding one of a plurality of different products to be obtained by welding, as viewed in said clamping directions, said transversely movable support having a plurality of operating positions corresponding to said plurality of groups of stationary clamps, and being selectively moved to said operating positions to bring one of said groups of stationary clamps into an operative position, according to the desired one of said different products.

14. A welding fixture according to claim 13, further comprising a longitudinally movable support which is movable in said longitudinal direction, at least one of said at least three movable clamps being supported on said longitudinally movable support, said longitudinally movable support having a plurality of operating positions, and being moved to one of said operating positions thereof according to the selected operating position of said transversely movable support, said at least one of said at least three movable clamps on said longitudinally movable support cooperating with said plurality of groups of stationary clamps on said transversely movable support, to clamp said component members of desired one of said different products.

15. A welding fixture according to claim 1, wherein said at least three movable clamps are disposed above said at least three stationary clamps, and are lowered and elevated relative to said at least three stationary clamps.

16. A welding fixture according to claim 1, further comprising a pair of auxiliary clamps corresponding to a pair of main clamps which consists of one of said at least three stationary clamps and corresponding one of said at least three movable clamps, said auxiliary clamps clamping said component members in opposite directions substantially perpendicular to said clamping directions of said main clamps.

* * * * *